(12) United States Patent
Keller et al.

(10) Patent No.: US 10,514,765 B1
(45) Date of Patent: Dec. 24, 2019

(54) WEARABLE ACCESSORY FOR FORCE FEEDBACK

(71) Applicant: Facebook Technologies, LLC, Menlo Park, CA (US)

(72) Inventors: Sean Jason Keller, Bellevue, WA (US); Tristan Thomas Trutna, Seattle, WA (US); David R. Perek, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/392,233

(22) Filed: Apr. 23, 2019

Related U.S. Application Data

(63) Continuation of application No. 15/632,042, filed on Jun. 23, 2017, now Pat. No. 10,310,608.

(60) Provisional application No. 62/354,567, filed on Jun. 24, 2016.

(51) Int. Cl.
  *G09G 5/00* (2006.01)
  *G06F 3/01* (2006.01)
  *G06F 1/16* (2006.01)

(52) U.S. Cl.
  CPC ............ *G06F 3/016* (2013.01); *G06F 1/163* (2013.01); *G06F 1/1694* (2013.01); *G06F 3/014* (2013.01)

(58) Field of Classification Search
  CPC . G06F 3/01; G06F 3/011; G06F 3/014; G06F 3/016; G06F 1/163; A63F 13/285
  See application file for complete search history.

(56) References Cited

U.S. PATENT DOCUMENTS

| 9,104,271 | B1 | 8/2015 | Adams et al. |
| 2002/0021277 | A1 | 2/2002 | Kramer et al. |
| 2008/0012826 | A1 | 1/2008 | Cunningham et al. |
| 2012/0182135 | A1* | 7/2012 | Kusuura .................. G06F 3/00 340/407.1 |
| 2017/0002290 | A1* | 1/2017 | Siemianowski ....... C09K 19/20 |
| 2018/0093121 | A1* | 4/2018 | Matsuura ............... G09B 23/28 |

\* cited by examiner

*Primary Examiner* — Adam R. Giesy
(74) *Attorney, Agent, or Firm* — Fenwick & West LLP

(57) ABSTRACT

A wearable actuation device allows a user to interact with virtual objects in an AR or VR environment by providing force or haptic feedback. The wearable actuation device includes one or more actuator assemblies anchored to each of the user's fingers and a controller configured to communicate with a head mounted display. Embodiments of the actuator assembly include an electrorheological actuator, an optically driven actuator, and a piezo actuator sandwich assembly each of which is configured to undergo a reversible change in stiffness in response to an applied voltage or current. In one or more embodiments, the actuator assembly is configured to stiffen, elongate, compress in response to the application of a current or voltage waveform. In still other embodiments, the actuator assembly determines a measure of the current stress or strain being applied by the user on the virtual object.

18 Claims, 7 Drawing Sheets

WEARABLE ACCESSORY FOR FORCE FEEDBACK

CROSS REFERENCE TO RELATED APPLICATION

This application is a continuation of co-pending U.S. application Ser. No. 15/632,042, filed Jun. 23, 2017, which claims priority to U.S. Application No. 62/354,567, filed Jun. 24, 2016, all of which are incorporated by reference in their entirety.

BACKGROUND

The disclosure relates to a wearable device with the ability to induce a force via actuation and/or articulation of a biological or artificial joint to provide haptic feedback.

In many virtual reality (VR) or augmented reality (AR) applications it is necessary to provide the user with a degree of haptic feedback that simulates the sense of touch by mechanically or electronically applying forces or motions to the user. This feedback can be used to assist in the creation, and/or manipulation of virtual or real objects remotely. VR systems consist, generally, of three components, displays, speakers, and haptic feedback. While electronic (e.g., visual) displays have been known for some time, VR applications require haptic feedback to fully immerse the user in their virtual world so that they may more effectively interact in the environment. Through the use of haptic feedback, a sense of touch can be added to previously visual-only solutions.

In fact, haptic interfaces may be useful in applications as diverse as remote surgery, medical training, robotics, VR gaming, and actuation by providing a sense of touch, pressure, and position to reproduce the strength, delicacy, and complexity of natural human movement. Moreover, these haptic actuators are not just limited to use as input devices, but can be also be used by designers to provide a high-degree-of-freedom output to the user. These haptic actuators can be used to provide feedback relating to the virtual surface they encounter, thereby allowing for faster and more natural workflow than that afforded by present methods.

Research into simulating the sensation of touch has been done to simulate different kinds of taction through various means, such as vibrations. These types of devices have been implemented in personal computers, game controllers, and mobile devices. Unfortunately, present devices are limited in that they do not allow for the accurate discrimination between various shapes, textures, and resiliencies.

SUMMARY

A wearable actuation device (such as a glove or other control adapted to be worn on a portion of a body) allows a user to interact with virtual objects in real-time by providing force or haptic feedback. In one or more embodiments, the user visualizes with a VR or AR environment through a head-mounted display (HMD). The wearable actuation device includes one or more actuator assemblies and a control device configured to communicate with the HMD. In response to one or more instructions from the HMD the wearable actuation device generates an electric, magnetic, or electromagnetic field to induce the appropriate force through the wearable actuation device. In various embodiments, each of the one or more actuator assemblies comprises a tube filled with a fluid or a beam comprising a crystal. In one or more embodiments, both the fluid and the crystal are responsive to an applied field (e.g., electric or magnetic field). In various embodiments, the application of an appropriate stimulus (e.g., electromagnetic, magnetic, or electric) results in a reversible change in stiffness. Such an actuation may be used to induce the sensation of applied stresses, or strains. For example, if the user if holding a virtual ball in an AR or VR environment, the induced stresses, and strains are used convey the sensations associated with holding a ball in real life.

In one or more embodiments, the wearable device comprises one or more actuator assemblies situated on a glove or other control adapted to be worn on a portion of a body. Embodiments of the actuator assembly include an electrorheological actuator, an optically driven actuator, and a piezo actuator sandwich assembly. The actuator assembly comprises one or more beams or tubes anchored through one or more fasteners to a flexible polymeric substrate, such as a glove. The beams or tubes provide force feedback by stiffening or deforming upon receipt of instructions from an HMD. In one or more embodiments, an increase in stiffness can provide haptic or force feedback by impeding the natural motion of the user. In other embodiments, the wearable device additionally provides a measure of the current stress or strain applied on each of the one or more actuator assemblies to the HMD.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
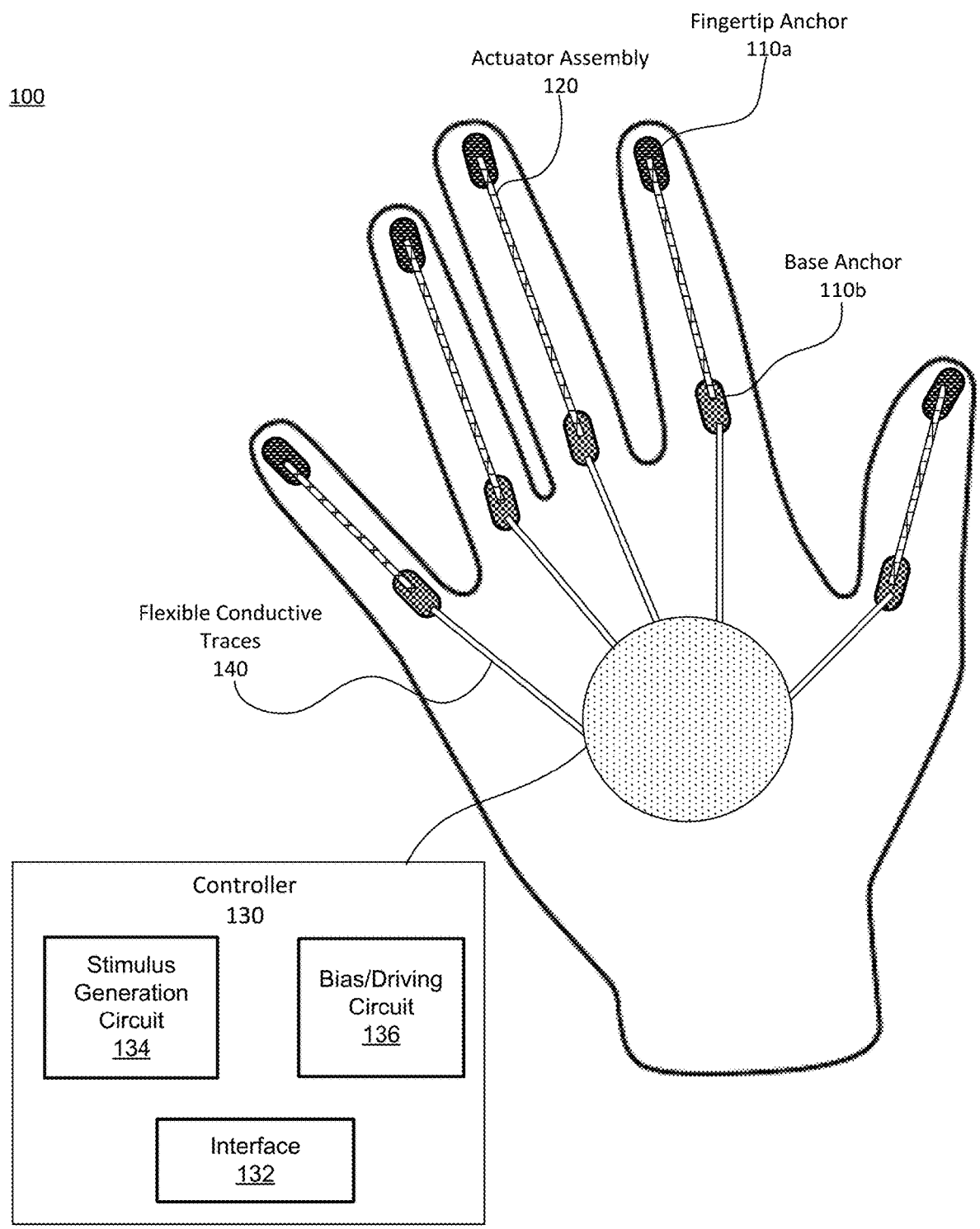
FIG. 1 illustrates a wearable accessory designed to transduce force feedback in accordance with one or more embodiments.

FIG. 1 illustrates a wearable accessory 100 designed to transduce force feedback in accordance with one or more embodiments. FIG. 1 depicts one of the user's hands wearing the wearable accessory 100. The wearable accessory 100 comprises a plurality of finger actuators (e.g., one on each finger). Each finger actuator comprises a fingertip anchor 110a, a base anchor 110b, and an actuator assembly 120. In some embodiments, each actuator assembly 120 may be integrated into the structure of the glove. For example, the finger actuator may be cast into the glove or added as a layer during the manufacturing process. The finger actuator is connected to a controller 130 through one or more flexible conductive traces 140 and is configured to actuate its stiffness, k, as described further below in conjunction with FIGS. 2-5.

The controller 130 comprises an interface 132, stimulus generation circuit 134, and a bias/driving circuit 136 for communicating with the associated AR or VR system environment. In one or more embodiments, the interface 132 is configured to provide instructions to one or more actuator assemblies associated with wearable accessory 100. In some embodiments, the VR or AR environment may comprise multiple wearable accessories. For example, there may be multiple controllers 130, each having an associated interface 132, with each controller 130 communicating with the associated wearable accessory 100. In the example embodiment described previously, the interface 132 is additionally configured to communicate with each of the multiple controllers 130. In alternative configurations, different and/or additional components may be included in the controller 130. Additionally or alternatively, functionality described in conjunction with one or more of the components shown in FIG. 1 may be distributed among the components of the controller 130 in a different manner than that described in conjunction with FIG. 1. For example, some or all of the functionality of the controller 130 may be provided by the interface 132.

The interface 132 communicates with a HMD and transmits instructions to the stimulus generation circuit 134 for the type of force feedback to be provided to the user. In one or more embodiments, the instructions received from the HMD include one or more actions being performed by the user in a VR or AR environment. Here, actions performed by a user include, for example, holding, throwing, or squeezing an object in a VR or AR environment. For example, the interface 132 may receive instructions from the HMD to produce the sensation of holding virtual object or otherwise manipulating the virtual object. In various embodiments, the interface 132 processes one or more instructions received from the HMD to determine one or more applied forces (e.g., a stress or strain) to be applied to the wearable accessory 100. The processed instructions are provided to the stimulus generation circuit 134. The stimulus generation circuit is further described below.

The interface 132 may additionally determine the magnitude of the force to be generated via the wearable accessory. In an example embodiment, in response to instructions associated with holding a hard ball with a radius of 2 centimeters (cm) in a VR or AR environment, the interface 132 generates instructions for the stimulus generation circuit 142 indicating that each of the actuator assemblies associated with a wearable accessory 100 should not be able to obtain a radius of curvature smaller than 2 cm. Instructions from the HMD may also include the material properties (e.g., elasticity, ductility, etc.) of the object being manipulated in a VR or AR environment. In still other embodiments, the interface 132 additionally determines a type of actuator assembly 120 to be stimulated in response to one or more instructions received from the HMD. For example, the interface 132 determines that an electrorheological actuator, light activated liquid crystal polymer (LCP) actuator, a piezoelectric actuator, or any combination thereof should be stimulated. The different embodiments of actuator assemblies are further described below in conjunction with FIGS. 2-5.

In still other embodiments, the interface 132 receives analog measurement of the applied stress or strain from each of the one or more actuator assemblies. In these embodiments, the interface 132 includes an analog to digital converter (ADC) for converting the received analog voltage into its appropriate digital representation. That is, the interface 132 is configured to determine a digital representation of the measured stress or strain. The interface 132 provides a measure of the stress or strain applied to an actuator assembly to the HMD. In still other embodiments, the status the interface 132 receives error codes associated with at least one of the one or more actuator assemblies associated the wearable accessory 100. The received error codes are provided to the HMD.

The stimulus generation circuit 134 generates one or more stimulus patterns designed to optimally induce force feedback in response to one or more received instructions. Here, the generated stimulus pattern comprises a combination of constant and time-varying current and voltage waveforms (i.e., triangular wave, square wave, sinusoidal wave, constant value, etc.). In one or more embodiments, the stimulus generation circuit 134 additionally comprises a stimulus pattern store. The stimulus pattern store stores one or more predetermined stimulus patterns associated with one or more actions. In an example embodiment, the stimulus generation circuit 134 is configured to retrieve a stored predetermined stimulus pattern from the store in response to a received instruction from the interface 132. In an example embodiment, the stimulus pattern store stores a stimulus pattern associated with simulating the sensation of holding a cup in an AR or VR environment. In the previous embodiment, generating a stimulus pattern simply comprises retrieving a stored stimulus pattern from the stimulus pattern store. In various other embodiments, the received instructions comprise instructions to modify a stored stimulus pattern. Therefore, generating a stimulus pattern may comprise retrieving a stored stimulus pattern and changing one or more of a frequency, an offset, an amplitude, and a delay associated with the stored stimulus pattern. The stimulus generation circuit 134 provides the generated stimulus pattern (e.g., voltage, current, or any combination thereof) to the bias/driving circuit 136.

The bias/driving circuit 136 generates a voltage, or current waveform in response to the instructions received from the stimulus generation circuit 134. In various embodiments, the bias/driving circuit 136 additionally conditions the generated voltage and current waveform for propagation along the one or more flexible conductive traces 140. For example, the bias/driving circuit 136 may comprise circuitry such as one or more amplifiers including digital, analog, mixed-signal signal processing blocks. In various embodiments, the bias/driving circuit 136 additionally comprises one or more frequency filters configured to eliminate external electromagnetic interference or provide immunity to electrostatic discharge. The bias/driving circuit 136 may also comprise an optical source such as a single or multi-mode laser capable of producing electromagnetic waves at one or more wavelengths. For example, if the actuator assembly 120 is stimulated by an electromagnetic waveguide the bias/driving circuit 136 is configured to generate and propagate an electromagnetic wave through the one or more flexible conductive traces 140. In other embodiments, the bias/driving circuit 136 is configured to efficiently generate and propagate a voltage, or current waveform through the flexible conductive traces 140. That is, the bias/driving circuit 136 contains circuitry to propagate a voltage or current waveform through the flexible conductive traces 140 with low loss.

Each of the one or more flexible conductive traces 140 forms a low resistance connection between an actuator assembly 120 and controller 130. In one or more embodiments, the flexible conductive trace is embedded with silver, graphite, or other conductive material. In one or more embodiments, the one or more flexible conductive traces 140 is bonded to or embedded in the flexible polymeric material (i.e., glove).

Electrorheological Actuator

Figure 2A:
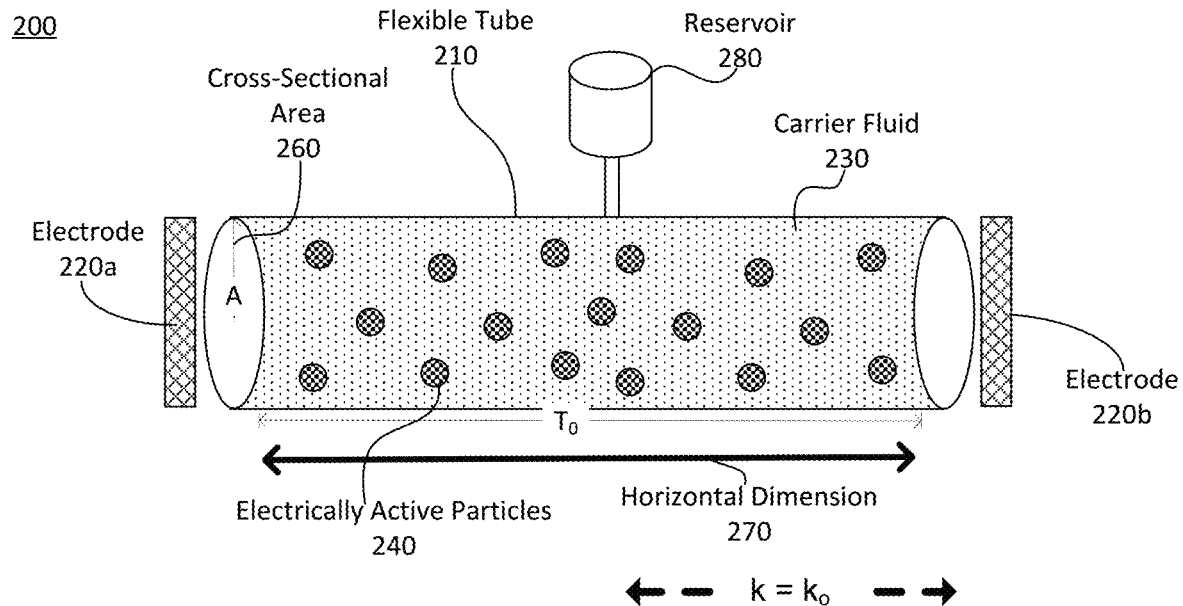
FIG. 2A illustrates a side view of an actuator assembly configured to undergo a change in stiffness due to an applied electric field in accordance with an embodiment.

FIG. 2A illustrates an actuator assembly 200 configured to undergo a change in stiffness due to an applied electric field in accordance with an embodiment. The actuator assembly 200 is an embodiment of the actuator assembly 120. FIG. 2A comprises a flexible tube 210 surrounded on the left by electrode 220a and on the right by electrode 220b. The flexible tube 210 comprises a carrier fluid 230. As illustrated in FIG. 2A, suspended in the carrier fluid 230 are a plurality of electrically active particles 240. The flexible tube 210 depicted in conjunction with FIG. 2A comprises a flexible polymeric material (e.g., rubber, polymer) and has a cross sectional area, A, 260. The flexible tube 210 has a length $T_o$ along a horizontal dimension 270. In the embodiment illustrated in FIG. 2A, the flexible tube 210 comprises a reservoir 280 such that the carrier fluid 230 can flow freely into and out of the reservoir 280.

Electrodes 220a and 220b are configured to generate a stimulating field through the flexible tube 210. The generated stimulating field is generated through the flexible tube 210 in a direction parallel to the horizontal dimension 270. In one or more embodiments, both the electrodes 220a and 220b comprise metallic plates with a low resistance (e.g., gold or silver) and the generated stimulating field is a uniform electric field. In other embodiments, the electrodes 220a and 220b are configured to generate a uniform magnetic field through the flexible tube 210 in a direction parallel to the horizontal dimension 270. For example, the electrodes 220a and 220b comprise one or more coils of wire such that the flow of current through the coils of wire generates the magnetic field.

The electrodes 220a and 220b are electrically connected (e.g., via flexible conductive traces 140) to a controller (e.g., controller 130). The electrodes 220a and 220b are configured to generate a stimulating field in response to a current or voltage waveform received from a local controller (e.g., controller 130). In an example embodiment, the electrodes 220a and 220b each generate a uniform electric field in response to an applied voltage. In another example embodiment, the electrodes 220a and 220b generate a uniform magnetic field in response to an applied current. Here, the generated stimulating field is proportional to the applied current or voltage waveform. For example, if the current or voltage waveform received by the electrodes 220a and 220b are time-varying (e.g., square wave, triangle wave, sinusoidal, etc.), then the generated stimulating field is also time-varying.

The carrier fluid 230 is electrically neutral carrier fluid capable of colloidally suspending the electrically active particles 240. In various embodiments, the carrier fluid 240 is an organic solvent or water capable of dissolving or colloidally suspending a plurality of particles. Some examples of the carrier fluid 230 include deionized water and various oils. The carrier fluid 240 may additionally comprise a surfactant. In some embodiments, the surfactant is configured such that it uniformly coats each of the plurality of particles.

The carrier fluid 230 comprises a plurality of electrically active particles 240 with an average diameter between 1 micrometer and 1 nanometer. In one or more embodiments, each of the plurality of electrically active particles 240 comprises a magnetic or electric dipole moment. That is, the presence of a stimulating field causes the electrically active particles 240 to align along field lines associated with the applied field. In various embodiments, the alignment of the electrically active particles 240 results in an increase in the viscosity, $\mu$, of the carrier fluid 230. For example, in the absence of an applied electric field, the electrically active particles 240 within the carrier fluid 230 are randomly dispersed throughout the carrier fluid 230 resulting in a nominal viscosity, $\mu_o$. In one or more example embodiments, nominal viscosities, $\mu_o$ of the carrier fluid 230 are within 0.1 and 100 centipoise (cP). On the other hand, the application of an electric field causes the plurality of electrically active particles 240 to align to the electric field lines thereby causing an increase in viscosity, $\mu$, such that $\mu$ is larger than the nominal viscosity $\mu_o$. For example, the ratio of the change in viscosity to the nominal viscosity is proportional to the magnitude of the electric field squared. Typically, the response time of a carrier fluid to an applied electric field (i.e., change in stiffness due to a change in the applied electric field) is on the order of $1/100$ to $1/1000$ seconds. Similarly, in other embodiments, the electrically active particles 240 are configured to align in the presence of a magnetic field such that the presence of a magnetic field results in an increase in viscosity $\mu$. In one or more embodiments, a change in viscosity, $\mu$, of the carrier fluid 230 results in a corresponding change in the stiffness, k, of the flexible tube (e.g., resistance to bending or flexing). Generally, the stiffness, k, of the flexible tube is related to the rate of bend and the fluid flow rate of the electrically active particles in the flexible tube 210. That is, the stiffness, k, of the flexible tube is proportional to the square of the magnitude of the stimulating field such that a in a corresponding change in the stiffness of the actuator assembly 200. In one or more example embodiments, the stiffness, k, may increase by 1000 percent in response to an applied electric or magnetic field.

The reservoir 280 is connected to the flexible tube via a conduit permeable to the carrier fluid 230. That is, carrier fluid 230 may flow freely into and out of the reservoir 280. In various embodiments, a deformation of the flexible tube 210 causes the carrier fluid 230 to flow into or out of the reservoir 280. For example, if the tube is bent such that the volume of the flexible tube 210 is deceased, the carrier fluid 230 within the flexible tube 210 flows from the flexible tube 210 into the reservoir 280. In another example, a deformation of the flexible tube 210 that results in an increase in the volume of the flexible tube 210 causes the carrier fluid 230 to flow from the reservoir 280 into the flexible tube 210.

Figure 2B:
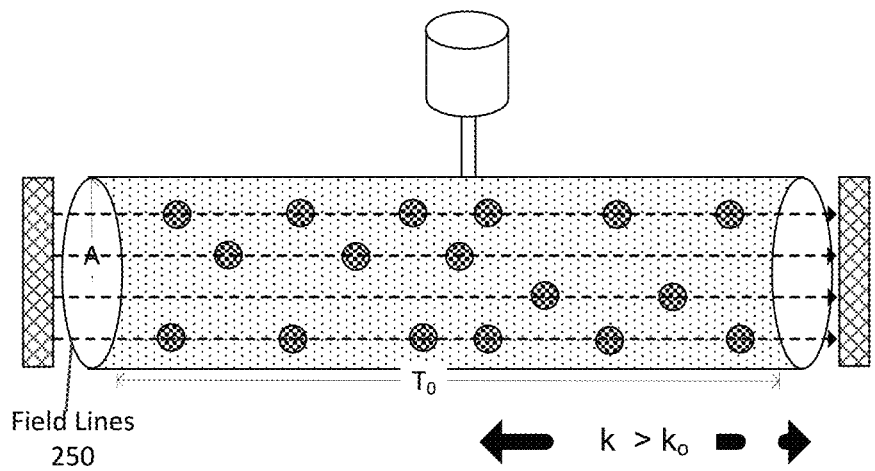
FIG. 2B illustrates the actuator assembly of FIG. 2A undergoing an increase in stiffness in response to an applied electric or magnetic field in accordance with one or more embodiments.

FIG. 2B illustrates the actuator assembly 200 depicted above in conjunction with FIG. 2A undergoing an increase in stiffness in response to an applied field in accordance with one or more embodiments. In FIG. 2B, the application of an electric field causes the generation of a plurality of field lines 250 through the flexible tube 210. Each of the plurality of field lines 250 originate at electrode 220a and terminate at electrode 220b in a direction parallel to the horizontal dimension 270. In alternate embodiments, the plurality of generated field lines 250 may originate at electrode 220b and terminate at electrode 220a. As further illustrated in FIG. 2B, the presence of an electric field causes the electrically active particles 240 to align along the plurality of field lines 250. As further described above, in conjunction with FIG. 2A, the generation of field lines due to an applied electric or magnetic field results in an increase in the stiffness, k, of the actuator assembly 200. In this way, for example, a glove embedded with an electrorheological actuator 200 may be used to provide the user with a sense of manipulating an object with various material properties (e.g., water, air, rubber, etc.) in a VR or AR environment.

Optically Driven Actuator

Figure 3A:
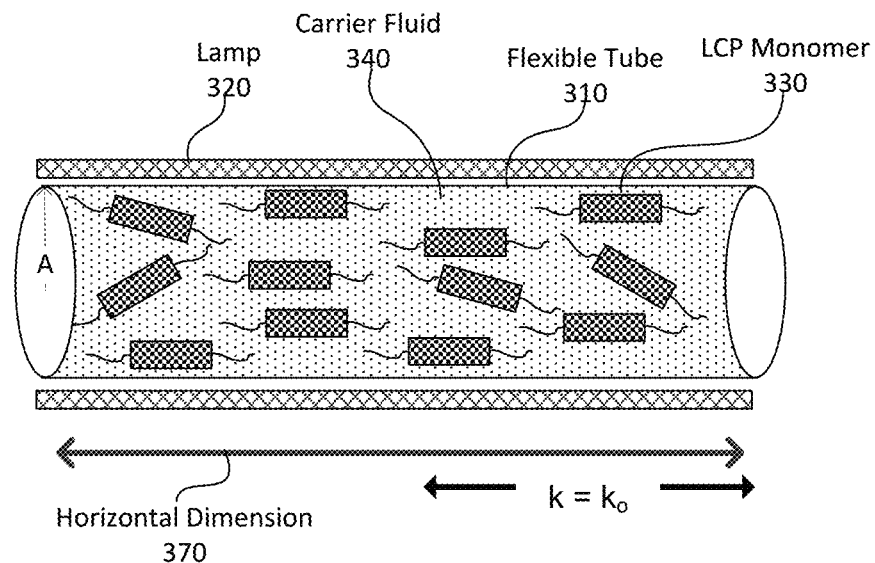
FIG. 3A illustrates a side view of an actuator assembly configured to undergo a change in stiffness in response to an applied electromagnetic field in response to an applied electromagnetic field in accordance with one or more embodiments.

FIG. 3A illustrates a side view of an actuator assembly 300 configured to undergo a change in stiffness in response to an applied electromagnetic field, in accordance with one or more embodiments. FIG. 3A comprises a flexible tube 310 surrounded by a lamp 320. The lamp 320 is configured to uniformly illuminate the flexible tube 310 with light of one or more wavelengths. In FIG. 3A the flexible tube 310, carrier fluid 340, and horizontal dimension 370 are embodiments of flexible tube 210, carrier fluid 230, and horizontal dimension 270, respectively.

The lamp 320 comprises one or more illumination sources configured to uniformly illuminate the flexible tube 310 with one or more wavelengths of light. Example illumination sources include light emitting diodes (LEDs), halogen lamps, lasers, or some other type of light emitting device. In various embodiments, the lamp 320 may illuminate the flexible tube 310 with particular ranges of wavelengths of light (i.e., "bands" of light.) Example bands of light illuminated by the lamp 320 include a visible band (~380 nanometers (nm) to 750 nm), an infrared (IR) band (~750 nm to 1500 nm), an ultraviolet band (10 nm to 380 nm), another portion of the electromagnetic spectrum, or some combination thereof. In one or more embodiments, each of the one or more illumination sources comprising the lamp 320 may emit light in a different band. That is, the lamp 320 is configured to illuminate the flexible tube 310 with light at a first wavelength and a second wavelength wherein the second wavelength is distinct from the first.

The lamp 320 is configured to illuminate the flexible tube 310 in response to instructions from a controller (e.g., controller 130). The controller provides an appropriate current or voltage waveform to activate the lamp 320 in one or more wavelengths. For example, the lamp 320 may emit light of a first wavelength and then a second wavelength distinct from the first in response to the appropriate instructions from the controller 130. In other embodiments, instructions received from the controller additionally comprise an intensity level, a wavelength, a duration. For example, instructions from the controller may cause the lamp 320 to illuminate the flexible tube 310 with light in the ultraviolet band for 30 seconds, at an intensity of 1 W/m².

The flexible tube 310 comprises a plurality of LCP monomers 330 colloidally suspended or selectively crosslinked. For ease of discussion, the combination of a plurality of LCP monomers 330, and a plurality of oligomers is referred to, herein, as a bulk elastomer. The LCP monomers 330 are configured such that illumination by a certain band of light (e.g., visible, or ultraviolet) results in a reversible structural change in the bulk elastomer. In an embodiment, the LCP monomers 330 are sensitive to ultraviolent light (e.g., 365 nm). When exposed to light, each of the plurality of LCP monomers 330 undergoes a phase change (e.g., from cis-isomer to trans-isomer). For example, a phase change experienced by the bulk elastomer includes hardening (e.g., increase in stiffness) as a result of a phase change of the LCP monomers 330. In various embodiments, the reversible structural change may occur on the order of a second when illuminated by the lamp 320.

The plurality of LCP monomers 330 may be configured to undergo a shape memory effect upon exposure to a certain band of light (e.g., visible, ultraviolet, or IR). In one or more embodiments, the plurality of LCP elements are configured to respond differently (e.g., undergo a contraction, a bending, a volume change, or any combination thereof.) when exposed to different wavelengths of light. In an example embodiment, when illuminated with light of a first wavelength, the plurality of LCP monomers 330 flex and when illuminated with light of a second wavelength the LCP monomers 330 revert to the original configuration.

The intensity of the illumination produced by the lamp 320 determines the stiffness, k, of the actuator assembly 300. That is, the stiffness of the actuator assembly 300 may be modulated by the magnitude of illumination. For example, when no illumination is applied to flexible tube 310 each LCP monomer of the plurality of LCP monomers 330 is randomly dispersed within the carrier fluid 340. Here, the random dispersal of the plurality of LCP elements is associated with a nominal stiffness, $k_o$. The nominal stiffness, $k_o$, may be in the range of 20-70 kilopascals (kPa). For example, an intensity of 1 W/m² results in an increase of stiffness, k, such that k is several times (e.g., 2 to 3 times) larger than the nominal stiffness $k_o$. In various embodiments, the intensity of illumination is ratio metrically related to the speed of phase change (i.e., a change from the cis- to trans-isomer). The intensity of illumination determines the fraction of the bulk elastomer within the actuator assembly 300 that undergoes the phase change. For example, a low intensity of illumination results in just 5% of the bulk elastomer undergoing a phase change while exposure to a high intensity of illumination results in 100% of the elastomer undergoing a phase change.

Figure 3B:
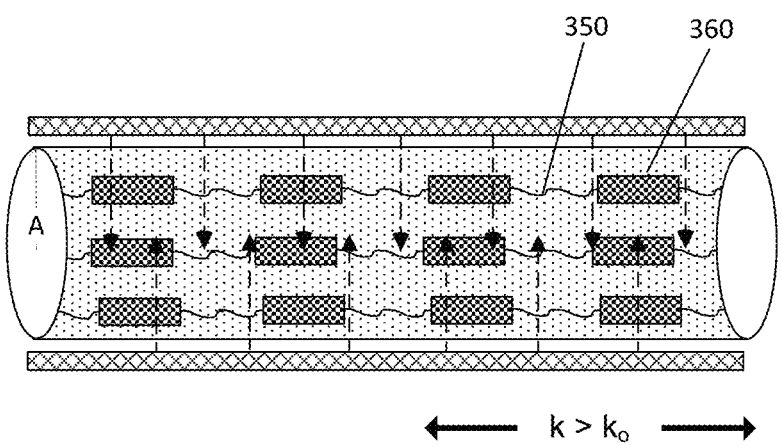
FIG. 3B illustrates the actuator assembly of FIG. 3A undergoing an increase in stiffness in response to an applied electromagnetic field in accordance with one or more embodiments.

FIG. 3B shows the flexible actuator assembly of FIG. 3A being irradiated by light from the lamp 320 in accordance with an embodiment. As shown in FIG. 3B, illumination by a first wavelength causes the generation of crosslinks 350 between each adjacent LCP monomer of the plurality of LCP monomers 330. In one or more embodiments, the formation of crosslinks 350 results in a structural change the carrier fluid 340. For example, the formation of crosslinks 350 may cause the carrier fluid 340 to "cure" or harden (e.g., increase in stiffness). In various other embodiments, illumination by light of a second wavelength different from the first induces a cleaving of the previously formed crosslinks 350. That is, the light induced structural change is reversible. Alternatively, the reversible cleaving of crosslinks 350 and the effect described in the previous example may be induced by a thermal phase change.

Piezo Actuator Sandwich Assemblies

Figure 4A:
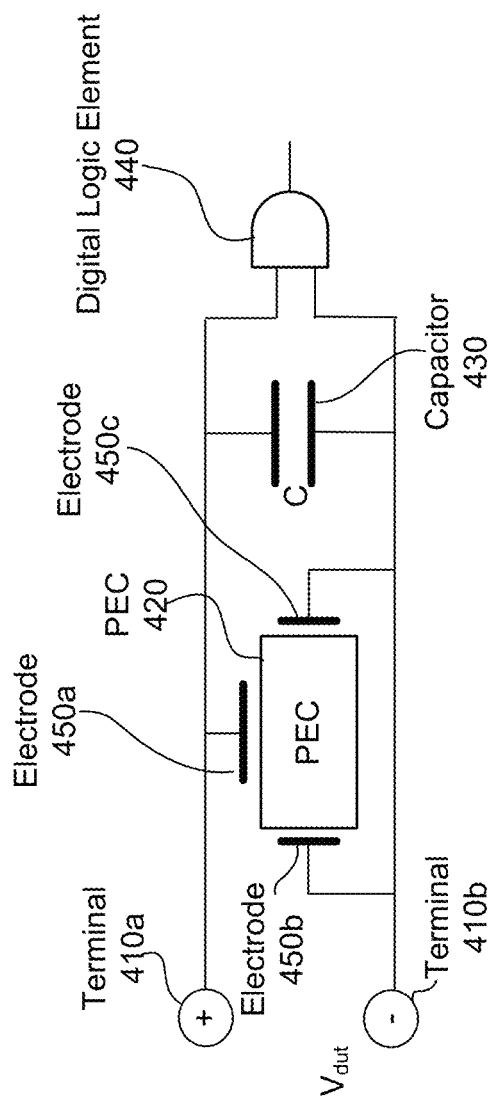
FIG. 4A illustrates an actuator assembly configured as a piezo actuator assembly, in accordance with an embodiment.

FIG. 4A illustrates an actuator assembly 400 configured as a piezo actuator sandwich assembly, in accordance with an embodiment. The actuator assembly 400 is an embodiment of actuator assembly 120. In one or more embodiments, the actuator assembly 400 generates a force on the user's finger (e.g., stress, strain, or resistance to an applied force). In one or more other embodiments, the actuator assembly 400 additionally provides a current measure of the stress or strain on the user's finger. The actuator assembly 400 illustrated in FIG. 4A comprises a positive and negative electrical terminal 410*a* and 410*b*, respectively, a piezo electric crystal (PEC) 420, a capacitor 430, a digital logic element 440, and electrodes 450*a*, 450*b*, and 450*c*.

The terminals 410*a* and 410*b* are configured to receive time-varying or constant voltage or current waveforms generated by a controller (e.g., controller 130), through flexible conductive traces 140. The PEC 420 is connected to the positive terminal 410*a* through electrode 450*a* and the negative terminal through electrodes 450*b* and 450*c*. In various embodiments, the electrodes 450*a*, 450*b*, and 450*c* form low resistance contacts with the PEC 420. The capacitor 430 may be charged to a predetermined voltage above the nominal bias voltage of the PEC 420. For example, the capacitor 430 is charged to a predetermined voltage of 30 volts such that no bias voltage need be provided by the 130 to obtain a measurement of applied strain or induce an actuation. In some embodiments capacitors 430 comprise a battery or voltage source. The capacitor 430 and PEC 420 are connected in parallel to digital logic element 440.

The digital logic element 440 communicates with the controller 130 through flexible conductive traces (e.g., flexible conductive traces 140) to provide a measure of applied strain received from the PEC 420. In various embodiments, the digital logic element 440 comprises one or more discreet logic elements such a AND gate, a NOR gate, a NOT gate, or any combination thereof. In other embodiments, the digital logic element 440 includes a processor that conditions a measurement of the applied strain. For example, the digital logic element 440 may contain an ADC to convert an analog signal obtained from the PEC 420 into a digital signal for communication with the controller 130. In other embodiments, the digital logic element 440 transmits one or more signals comprising an analog measure of the applied strain to the controller 130, including one or more capacitors, inductors, and resistors that eliminate electromagnetic interference and reduce the effects of electrostatic discharge. In some embodiments, the digital logic element 440 also contains circuitry such as a voltage source, current source, and charge pump to charge capacitor 430 to a predetermined bias voltage.

Figure 4B:
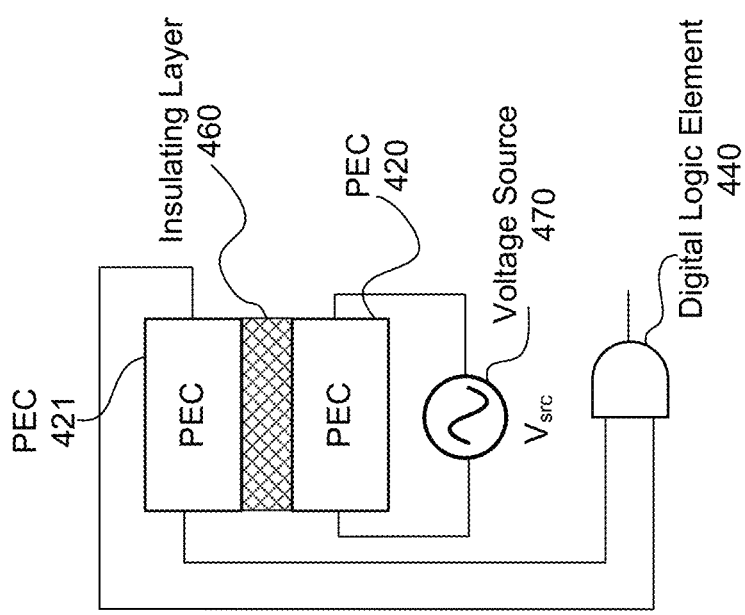
FIG. 4B illustrates an actuator assembly configured as a piezo actuator sandwich assembly in accordance with an embodiment.

FIG. 4B illustrates another embodiment of an actuator assembly 400 in accordance with an embodiment. In FIG. 4B the actuator assembly 400 includes a first PEC 420 and a second PEC 421 are separated by a deformable insulating layer 460. The first PEC 420 is connected to a voltage source 470 and may be used to induce actuation, while the second PEC 421 is connected to the digital logic element 440 and may be used detect the magnitude of the applied strain. In one or more embodiments, the digital logic element 440 contains similar functionality as that described above in conjunction with FIG. 4A.

In various embodiments, the first PEC 420 is modulated by voltage source 470 to produce actuation. For example, in response to a voltage from the voltage source 470, the first PEC 420 is induced to bend, flex, compress, elongate, or any combination thereof. In some embodiments, the voltage source 470 generates a constant or time-varying voltage or current pulse to actuate the first PEC 420. In other embodiments, the voltage source 470 is a voltage input generated by the controller 130 in response to a stimuli received from the AR or VR system.

The digital logic element 440 generates an output of the piezo-sandwich actuator. The output of the piezo-sandwich actuator comprises magnitude of the strain currently being applied to the actuator assembly (e.g., actuator assembly 120) associated with the digital logic element 440. In other embodiments, the output of the piezo-sandwich assembly 400 is time multiplexed to provide both a magnitude of actuation and a measurement of the stresses induced on the glove. In various embodiments, the controller 130 additionally comprises an AC source so that time multiplexing the piezo assembly produces the requisite DC pre-bias voltage within the piezo-sandwich assembly without the use of an external voltage source.

Radius of curvature of a Finger

FIGS. 5A-5D illustrate a radius of curvature of an actuator assembly 120 as a function of a voltage or a current in accordance with an embodiment. Each of the FIGS. 5A-5D comprises an actuator assembly 120, a fingertip anchor 110*a*, and a base anchor 110*b*. As described above in conjunction with FIG. 1. In one or more embodiments the voltage, current, is received from a controller (e.g., controller 130). As described above in conjunction with FIGS. I-4, the application of a voltage or a current results in a change in stiffness, k, of the actuator assembly 120. In one or more embodiments, the actuator assembly 120 is further configured to apply a force (e.g., stress or strain) to the user's finger. In still other embodiments, the actuator assembly 120 is additionally configured to measure the magnitude stress or strain being applied to the user's finger. The actuator assembly 120 provides the measure of the applied stress or strain to the HMD associated with the user via a controller (e.g., controller 130).

Figures 5A, 5B, 5C, 5D:
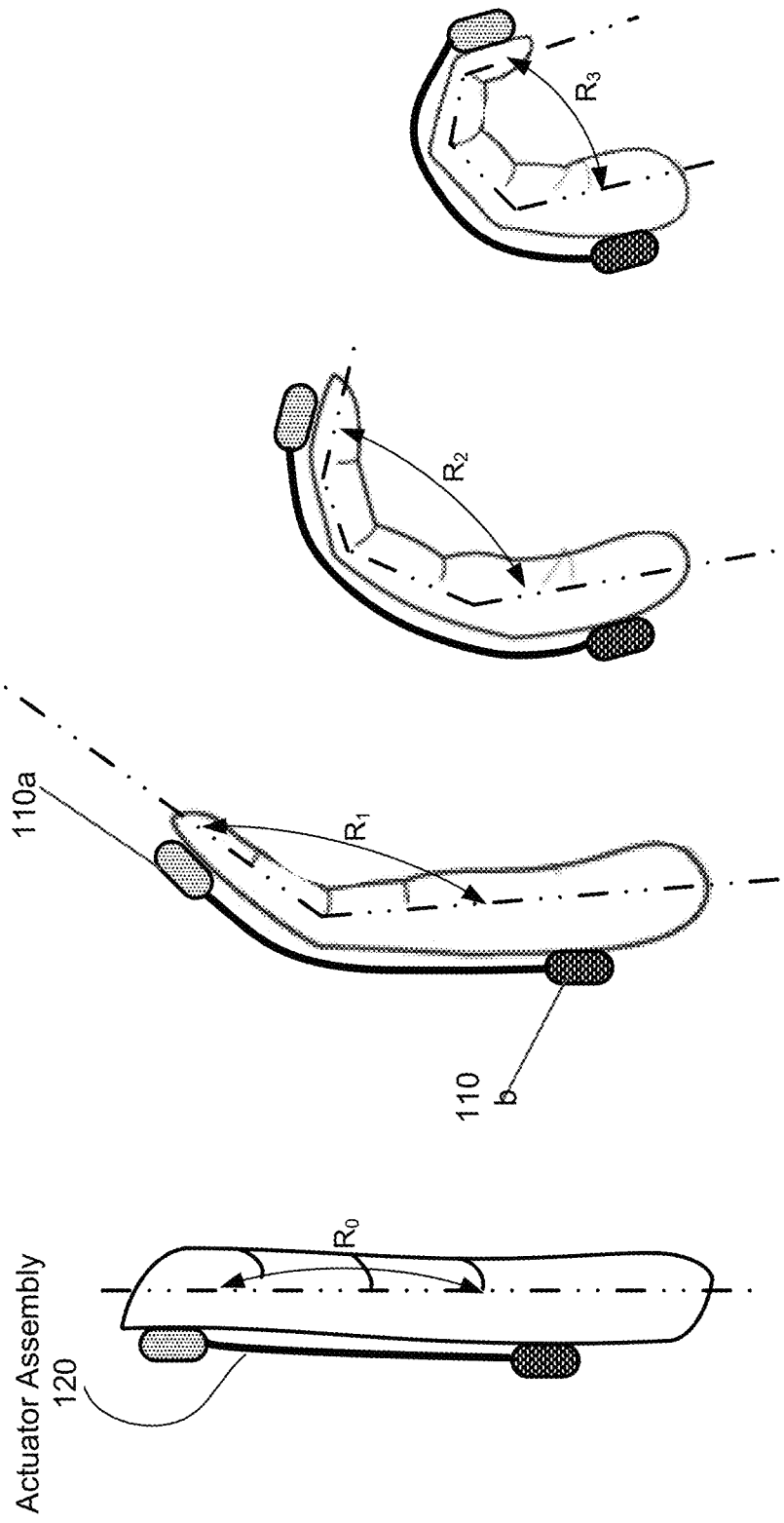
FIGS. 5A-5D each illustrate a different radius of curvatures along a finger actuated by an actuator assembly in accordance with an embodiment.

FIGS. 5B-5D show a finger undergoing illustrative incremental decreases in radii of curvature, r, (e.g., $R_o > R_1 > R_2 > R_3$) resulting from a decrease in the magnitude of the voltage or current being applied to the actuator assembly 120. For example, in the embodiment depicted in conjunction with FIG. 5A, the user's finger is unbent (i.e., actuator assembly 120 at maximum stiffness). Similarly, FIG. 5D shows a finger fully bent (i.e., actuator assembly 120 at minimum stiffness). Here a change in stiffness enables the wearable accessory to provide a force feedback to the user in response to one or more actions performed by the user in a VR or AR environment.

Figure 6:
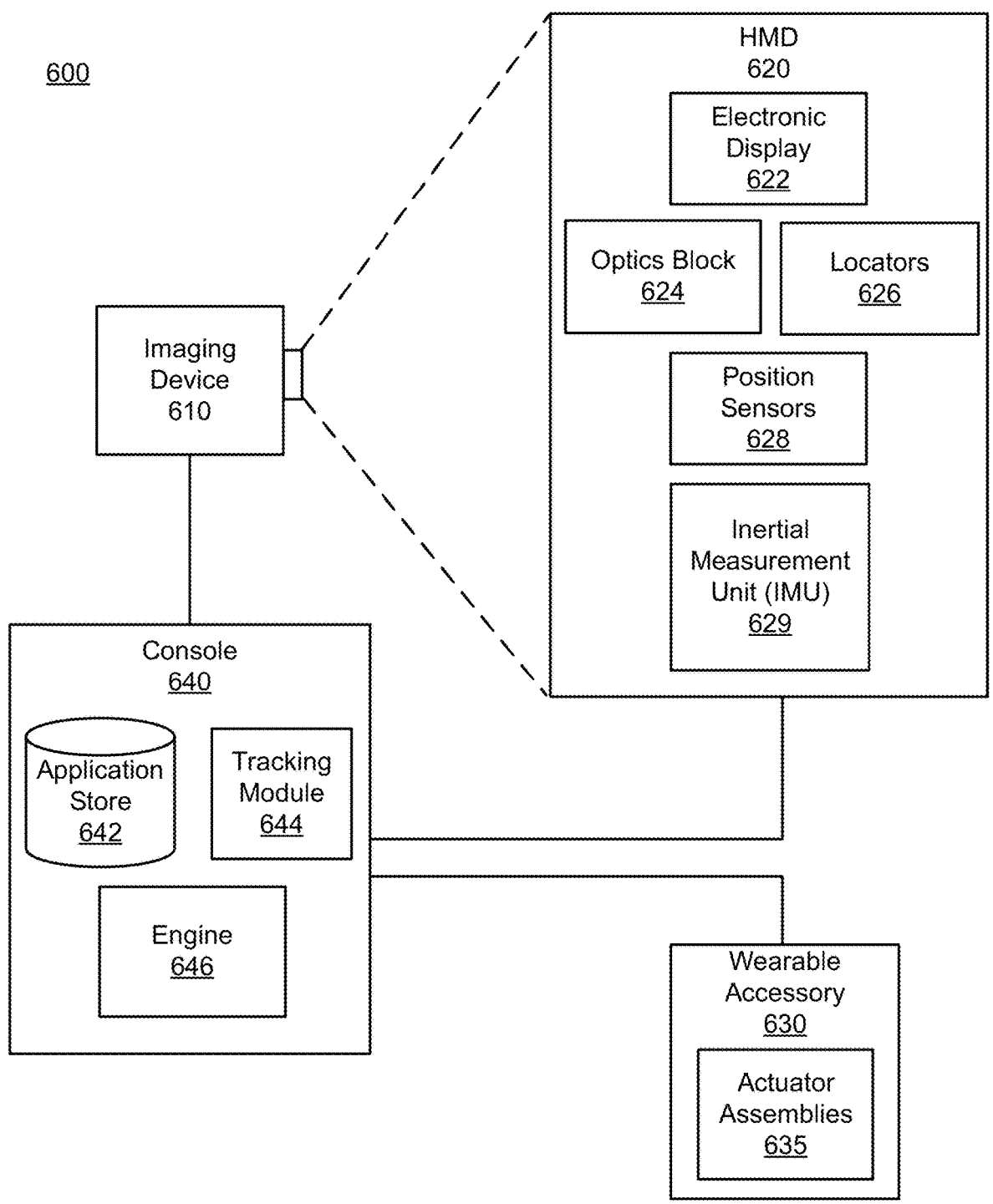
FIG. 6 is a block diagram of a system including a wearable accessory, in accordance with an embodiment.

FIG. 6 is a block diagram of a system environment 600 including a wearable accessory 630, in accordance with one embodiment. The system environment 600 may operate in a VR environment, an augmented reality (AR) environment, a mixed reality (MR) environment, or some combination thereof. The system 600 comprises a HMD 620, an imaging device 610, and the wearable accessory 630, which are each coupled to a console 640. While FIG. 6 shows an example system environment 600 including one HMD 620, one imaging device 610, and one wearable accessory 630, in other embodiments any number of these components may be included in the system environment 600. For example, there may be multiple HMDs 620 each having an associated wearable accessory 630 and being monitored by one or more imaging devices 610, with each HMD 620, wearable accessory 630, and imaging device 610 communicating with the console 640. In alternative configurations, different and/or additional components may be included in the system environment 600.

The HMD 620 is a head-mounted display that presents content to a user. Examples of content presented by the HMD 620 include one or more images, video, audio, or some combination thereof. In some embodiments, audio is presented via an external device (e.g., speakers and/or headphones) that receives audio information from the HMD 620, the console 640, or both, and presents audio data based on the audio information. The HMD 620 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 620 may act as an augmented reality (AR) and/or mixed reality (MR) headset. In these embodiments, the HMD 620 augments views of a physical, real-world environment with computer-generated elements (e.g., images, video, and sound).

The HMD 620 includes an electronic display 622, an optics block 624, one or more locators 626, one or more position sensors 628, and an inertial measurement unit (IMU) 629. In different embodiments, the HMD 620 may include different or additional components than those described in conjunction with FIG. 6. Additionally, the functionalities further described below may be distributed among components of the HMD 620 differently than as described in conjunction with FIG. 6.

The optics block 624 magnifies received light from the electronic display 622, corrects optical errors associated with the image light, and the corrected image light is presented to a user of the HMD 620. The optics block 624 includes one or more optical elements to correct the optical errors. An optical element may be an aperture, a Fresnel lens, a convex lens, a concave lens, a filter, or any other suitable optical element that affects the image light emitted from the electronic display 622. Moreover, the optics block 624 may include combinations of different optical elements. In some embodiments, one or more of the optical elements in the optics block 624 may have one or more coatings, such as anti-reflective coatings.

The locators 626 are objects located in specific positions on the HMD 620 relative to one another and relative to a specific reference point on the HMD 620. A locator 520 may be a light emitting diode (LED), a corner cube reflector, a reflective marker, a type of light source that contrasts with an environment in which the HMD 620 operates, or some combination thereof. In embodiments where the locators 626 are active (i.e., an LED or other type of light emitting device), the locators 626 may emit light in the visible band, in the infrared band, in the ultraviolet band, some other portion of the electromagnetic spectrum, or some combination thereof.

In some embodiments, the locators 626 are located beneath an outer surface of the HMD 620, which is transparent to the wavelengths of light emitted or reflected by the locators 626 or is thin enough to not substantially attenuate the wavelengths of light emitted or reflected by the locators 626. Additionally, in some embodiments, the outer surface or other portions of the HMD 620 are opaque in the visible band of wavelengths of light. Thus, the locators 626 may emit light in the IR band under an outer surface that is transparent in the IR band but opaque in the visible band.

The IMU 629 is an electronic device that generates fast calibration data based on measurement signals received from one or more of the position sensors 628. A position sensor 525 generates one or more measurement signals in response to motion of the HMD 620. Examples of position sensors 628 include: one or more accelerometers, one or more gyroscopes, one or more magnetometers, another suitable type of sensor that detects motion, a type of sensor used for error correction of the IMU 629, or some combination thereof. The position sensors 628 may be located external to the IMU 629, internal to the IMU 629, or some combination thereof.

Based on the one or more measurement signals from one or more position sensors 628, the IMU 629 generates fast calibration data indicating an estimated position of the HMD 620 relative to an initial position of the HMD 620. For example, the position sensors 628 include multiple accelerometers to measure translational motion (forward/back, up/down, left/right) and multiple gyroscopes to measure rotational motion (e.g., pitch, yaw, and roll). In some embodiments, the IMU 629 rapidly samples the measurement signals and calculates the estimated position of the HMD 620 from the sampled data. For example, the IMU 629 integrates the measurement signals received from the accelerometers over time to estimate a velocity vector and integrates the velocity vector over time to determine an estimated position of a reference point on the HMD 620. Alternatively, the IMU 629 provides the sampled measurement signals to the console 640, which determines the fast calibration data. The reference point is a point that may be used to describe the position of the HMD 620. While the reference point may generally be defined as a point in space; however, in practice the reference point is defined as a point within the HMD 620 (e.g., a center of the IMU 629).

The IMU 629 receives one or more calibration parameters from the console 640. As further discussed below, the one or more calibration parameters are used to maintain tracking of the HMD 620. Based on a received calibration parameter, the IMU 629 may adjust one or more IMU parameters (e.g., sample rate). In some embodiments, certain calibration parameters cause the IMU 629 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 610 generates slow calibration data in accordance with calibration parameters received from the console 640. Slow calibration data includes one or more images showing observed positions of the locators 626 that are detectable by the imaging device 610. The imaging device 610 may include one or more cameras, one or more video cameras, any other device capable of capturing images including one or more of the locators 626, or some combination thereof. Additionally, the imaging device 610 may include one or more filters (e.g., used to increase signal to noise ratio). The imaging device 610 is designed to detect light emitted or reflected from locators 626 in a field of view of the imaging device 610. In embodiments where the locators 626 include passive elements (e.g., a retroreflector), the imaging device 610 may include a light source that illuminates some or all of the locators 626, which retroreflect the light towards the light source in the imaging device 610. Slow calibration data is communicated from the imaging device 610 to the console 640, and the imaging device 610 receives one or more calibration parameters from the VR console 640 to adjust one or more imaging parameters (e.g., focal length, focus, frame rate, ISO, sensor temperature, shutter speed, aperture).

The wearable accessory 630 is a device that allows the console 640 to provide haptic feedback to a user. Haptic feedback provided to the user includes a sensation of force feedback. In one embodiment, the wearable accessory 630 is a glove that renders a sensation of stiffness, malleability, and other material properties associated with a virtual object to a user wearing the glove. An increase or decrease in the amount of stiffness interact with a virtual object by allowing the user to "feel" the virtual environment around them. In other embodiments, the wearable accessory 630 transmits a measure of the applied force associated with each of the user's fingers to the console 640.

In FIG. 6, the wearable accessory 630 includes one or more actuator assemblies 635. The one or more actuator assemblies 635 are embodiments of actuator assemblies described above in conjunction with FIGS. 1-5. The wearable accessory 630 receives, from the console 640, one or more instructions comprising material properties associated with the virtual object being manipulated. In various embodiments, the wearable accessory 630 provides the console 640 with a current measurement of the stress or strain being applied to each actuator assemblies 635 associated with the wearable accessory 630. The wearable accessory 630 provides the user with haptic feedback including a sensation of touching and/or manipulating a stiff or malleable virtual object in a virtual environment. For example, if a user is squeezing a virtual balloon, the wearable accessor 630 provides the console 640 with information indicating force being applied by the user. For example, if the user squeezes too hard, the VR environment will render the balloon as bursting or otherwise deforming in the virtual environment. As another example, if the user is holding a cup in the VR environment, the wearable accessory 630 provides a sensation of the brittleness of the cup to the user based on one or more instructions received from the console 640.

The console 640 provides content to the HMD 620 for presentation to the user in accordance with information received from one or more of: the imaging device 610, the HMD 620, and the wearable accessory 630. In the example shown in FIG. 6, the console 640 includes an application store 642, a tracking module 644, and an engine 646. Some embodiments of the console 640 have different modules than those described in conjunction with FIG. 6. Similarly, the functions further described below may be distributed among components of the console 640 in a different manner than is described here.

The application store 642 stores one or more applications for execution by the console 640. An application is a group of instructions, that when executed by a processor, generates content for presentation to the user. Content generated by an application may be in response to inputs received from the user via movement of the HMD 620 or the wearable accessory 630. Examples of applications include: gaming applications, conferencing applications, video playback application, or other suitable applications.

The tracking module 644 calibrates the system environment 500 using one or more calibration parameters and may adjust one or more calibration parameters to reduce error in determination of the position of the HMD 620. For example, the tracking module 644 adjusts the focus of the imaging device 610 to obtain a more accurate position for observed locators on the HMD 620. Moreover, calibration performed by the tracking module 644 also accounts for information received from the IMU 629. Additionally, if tracking of the HMD 620 is lost (e.g., the imaging device 610 loses line of sight of at least a threshold number of the locators 626), the tracking module 644 re-calibrates some or all of the system environment 600.

The tracking module 644 tracks movements of the HMD 620 using slow calibration information from the imaging device 610. The tracking module 644 determines positions of a reference point of the HMD 620 using observed locators from the slow calibration information and a model of the HMD 620. The tracking module 644 also determines positions of a reference point of the HMD 620 using position information from the fast calibration information. Additionally, in some embodiments, the tracking module 644 may use portions of the fast calibration information, the slow calibration information, or some combination thereof, to predict a future location of the HMD 620. The tracking module 644 provides the estimated or predicted future position of the HMD 620 to the engine 646.

The engine 646 executes applications within the system environment 500 and receives position information, acceleration information, velocity information, predicted future positions, or some combination thereof of the HMD 620 from the tracking module 644. Based on the received information, the engine 646 determines content to provide to the HMD 620 for presentation to the user. For example, if the received information indicates that the user has looked to the left, the Engine 646 generates content for the HMD 620 that mirrors the user's movement in a virtual environment. Additionally, the engine 646 performs an action within an application executing on the VR console 640 in response to an action request received from the wearable accessory 630 and provides feedback to the user that the action was performed. The provided feedback may be visual or audible feedback via the HMD 620 or haptic feedback via the wearable accessory 630.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A wearable device comprising:
   a wearable structure configured to be worn by a user;
   one or more actuator assemblies attached to the wearable structure, each actuator assembly configured undergo a change in stiffness in response to an applied stimulus pattern, wherein each of the one or more actuator assemblies comprises:
      a flexible tube containing a carrier fluid, wherein the flexible tube has a length that is bounded by a first end and a second end, and the flexible tube is positioned along a joint of the user such the flexible tube is configured to bend along its length, and
      a first electrode coupled to the first end of the flexible tube and a second electrode coupled to the second end of the flexible tube, the first electrode and the second electrode configured to generate an electric field lengthwise across the flexible tube in response to an applied signal; and
   a controller coupled to the actuator assembly, the controller configured to:
      determine one or more forces to be applied on each of the one or more actuator assemblies,
      generate one or more stimulus patterns based at least in part on the determined forces, and
      provide the generated stimulus patterns to the one or more actuator assemblies.

2. The wearable device of claim 1, wherein the carrier fluid is electrically neutral.

3. The wearable device of claim 1, wherein the flexible tube comprises a reservoir configured to retain carrier fluid, wherein the reservoir is internal to the actuator assembly.

4. The wearable device of claim 3, wherein the reservoir is coupled to the flexible tube by a conduit permeable to the carrier fluid.

5. The wearable device of claim 1, wherein the carrier fluid colloidally suspends a plurality of electrically active particles.

6. The wearable device of claim 5, wherein the plurality of electrically active particles have a dipole moment and are configured to align along the generated electric field.

7. The wearable device of claim 1, wherein the carrier fluid comprises a surfactant.

8. The wearable device of claim 1, wherein the generated electric field is a uniform electric field.

9. The wearable device of claim 1, wherein the stiffness of each of the one or more actuator assemblies is related to a magnitude of the applied signal.

10. The wearable device of claim 1, wherein the first electrode and the second electrode are comprised of two or more metallic plates.

11. The wearable device of claim 1, wherein the flexible tube comprises a flexible polymeric material.

12. The wearable device of claim 1, wherein the applied signal is one of: a voltage or a current.

13. A method comprising:
   determining, by a controller, one or more forces to be applied on each of one or more actuator assemblies, wherein each of the one or more actuator assemblies comprises a first electrode, a second electrode, and a flexible tube containing a carrier fluid, wherein the flexible tube has a length that is bounded by a first end and a second end, and the flexible tube is positioned along a joint of the user such the flexible tube is configured to bend along its length, and the first electrode is coupled to the first end of the flexible tube and the second electrode is coupled to the second end of the flexible tube, the first electrode and the second electrode configured to generate an electric field lengthwise across the flexible tube in response to an applied signal;
   generating, by the controller, one or more stimulus patterns based at least in part on the determined forces; and
   providing the generated stimulus patterns to the one or more actuator assemblies, wherein the one or more actuator assemblies are configured to undergo a change in stiffness in response to the stimulus pattern.

14. The method of claim 13, wherein responsive to the provided stimulus patterns, the one or more actuator assemblies apply a signal to the set of electrodes.

15. The method of claim 14, wherein responsive to the signal applied to the first electrode and the second electrode, generating, by the first electrode and the second electrode, an electric field across the flexible tube.

16. The method of claim 15, wherein the electric field is a uniform electric field.

17. The method of claim 13, wherein the stiffness of each of the one or more actuator assemblies is related to a magnitude of the generated one or more stimulus patterns.

18. The method of claim 13, wherein the one or more generated stimulus patterns are provided to the one or more actuator assemblies via one or more flexible conductive traces.

* * * * *